US008502836B2

(12) United States Patent  (10) Patent No.: US 8,502,836 B2
Theimer et al.  (45) Date of Patent: Aug. 6, 2013

(54) UNIFIED VISUAL PRESENTER (75) Inventors: Wolfgang Michael Theimer, Bochum (DE); Kevin Ang, Bochum (DE); Dominic Sacre, Bochum (DE)

(73) Assignee: Research In Motion Limited, Waterloo (CA)

( * ) Notice: Subject to any disclaimer, the term of this patent is extended or adjusted under 35 U.S.C. 154(b) by 756 days.

(21) Appl. No.: 12/713,451

(22) Filed: Feb. 26, 2010

(65) Prior Publication Data

US 2011/0210983 A1 Sep. 1, 2011

(51) Int. Cl.
G09G 5/14 (2006.01)
(52) U.S. Cl.
USPC .......................... 345/634; 345/156; 345/173
(58) Field of Classification Search
None
See application file for complete search history.

(56) References Cited

U.S. PATENT DOCUMENTS

| 7,454,077 | B1 | 11/2008 | MacKenzie et al. |
| 2002/0080091 | A1 | 6/2002 | Acharya |
| 2002/0161796 | A1 | 10/2002 | Sylthe |
| 2005/0036509 | A1 | 2/2005 | Acharya |
| 2005/0122427 | A1 | 6/2005 | Hougui et al. |
| 2007/0050054 | A1 | 3/2007 | Sambandam Guruparan et al. |
| 2008/0092085 | A1 | 4/2008 | Yuan et al. |
| 2008/0195698 | A1 | 8/2008 | Stefanovic |
| 2008/0231465 | A1 | 9/2008 | Lee |
| 2009/0160862 | A1 | 6/2009 | Kim et al. |
| 2009/0237288 | A1 | 9/2009 | Yamamoto |
| 2009/0281874 | A1 | 11/2009 | Leblance et al. |

FOREIGN PATENT DOCUMENTS

| CA | 2517288 | 2/2006 |
| EP | 2091200 | 8/2009 |
| JP | 2002016677 | 1/2002 |
| JP | 2003078977 | 3/2003 |
| WO | 2008013538 | 1/2008 |
| WO | WO 2009/079795 | 7/2009 |
| WO | 2009125061 A1 | 10/2009 |

OTHER PUBLICATIONS http://mail.google.com/mail/help/intl/en/about_whatsnew.html; View as slideshow ; retrieved Apr. 1, 2010.
http://hackedgadgets.com/2008/06/05/wireless-accelerometer-mouse-pointer/;Wireless Accelerometer Mouse Pointer ; retrieved Apr. 1, 2010.
http://www.dynamicdrive.com/dynamicindex13/trailer.htm; Image Trail ; retrieved Apr. 1, 2010.
http://zamar.com ; File conversion sites ; retrieved Apr. 1, 2010.
http://www.erightsoft.com/super.html ; Super ; retrieved Apr. 1, 2010.

(Continued)

*Primary Examiner* — Kee M Tung
*Assistant Examiner* — Sing-Wai Wu
(74) *Attorney, Agent, or Firm* — Novak Druce Connolly Bove + Quigg LLP (57) ABSTRACT

The present document relates to the presentation of visual data that is stored on a mobile communication device, in particular to the presentation of sequences of images such as slideshows that may further include animation sequences as well as static images. A method for displaying data includes: transferring visual data from a mobile communication device (100) to a rendering device (200) via a wireless communication link; transferring control data from the mobile communication device (100) to the rendering device (200); rendering the received visual data in the rendering device (200); and displaying the visual data, where the displaying of the visual data is controlled in accordance with the control data received from the mobile communication device (100).

16 Claims, 5 Drawing Sheets

(56) References Cited

OTHER PUBLICATIONS http://media-convert.com http://media-convert.com/konvertieren ; Media Convert ; retrieved Apr. 1, 2010.

http://www.scansoft.com; Scansoft ; retrieved Apr. 1, 2010.

http://www.allaboutsymbian.com/features/item/TV_Out_on_the_Nokia_N95-Part_1_Will_the_smartphone_eat_the_PC.php; Will the smartphone eat the PC? (+ How to connect N95 TV Out to TV) ; retrieved Apr. 1, 2010.

http://www.geniusreviews.org/2009/04/samsung-mbp200-micro-projector-available-in-korea ; retrieved Apr. 1, 2010.

http://www.mobilecomputermag.co.uk/tag-pico-projectors.html ; retrieved Apr. 1, 2010.

http://www.download3000.com/download_14973.html ; Anvsoft Flash Slide Show Maker ; retrieved Apr. 1, 2010.

http://en.wikipedia.org/wiki/Gif ; Graphics Interchange Format ; retrieved Apr. 1, 2010.

http://www.w3.org/TR/SMIL/ ; Synchronized Multimedia Integration Lanuage (SMIL 3.0) ; retrieved Apr. 1, 2010.

Knut Ola Topland: "Mobile Learning Technological Challenges on Multi-Channel e-Learning Services," Oct. 26, 2004, XP002591344; retrieved on Jul. 9, 2010 from http://student.grm.hia.no/master/ikt02/ikt6400/g05/Rapport_files/Diplom%20Knut%2001a.pdf.

Hall, Andrew; "Using Web Standards to Deliver Recorded Multimedia Presentations in an University Environment," Jul. 10, 2007, XP002591345, retrieved on Jul. 9, 2010 from https://www.cs.kent.ac.uk/pubs/ug/2007/co620-projects/elearn/report.pdf.

Boring, Sebastian, et al., "Scroll, tilt or move it: using mobile phones to continuously control pointers on large public displays," Proceedings of the 21st Annual conference of the Australian Computer-Human Interaction, vol. 411, Nov. 23, 2009, pp. 161-168, XP002615946, retrieved on Jan. 10, 2011 from http://doi.acm.org/10.1145/1738826.1738853.

Myers, Brad A., "Using handhelds for wireless remote control of PCs and appliances," Interacting with Computers, vol. 17, No. 3, Jul. 28, 2004, pp. 251-264, XP002615947, retrieved on Jan. 10, 2011 from http://www.sciencedirect.com/science?_ob=M1mg&_imagekey=B6V0D-4CYNV37-1-1&_cdi=5644&user=987766&_pii=S0953543804000712&_orig=search&coverDate=05%2F31%2F2005&+sk=999829996%view=c&wchp=dGLbVtz-zSkWA%md5=e23c2481d6aa593a78371036e2e9dac2%ie=sdarticle.pdf, pp. 258-259.

Myers, Brad A., "Using Handhelds and PCs Together," 2001-11, XP002351044, retrieved on Oct. 26, 2005 from http://www.cs.cmu.edu/afs/cs.cmu.edu/project/pebbles/www/papers/pebbles/www/papers/pebblescacm.pdf.

Examination Report mailed Jan. 26, 2012. In corresponding application No. 10154864.2.

UNIFIED VISUAL PRESENTER

TECHNICAL FIELD

The present document relates to the presentation of visual data that is stored on a mobile communication device, in particular to the presentation of sequences of images and slideshows that include animation sequences as well as static images. The visual data can be displayed on an external display device with high resolution, and the presentation controlled via the mobile communication device.

BACKGROUND

In many situations people want to show documents, presentations, pictures or movies to others to support the explanation of their ideas with visual information. Like using a diagram on a piece of paper, a natural and instantaneous experience is desired for presenting visual information electronically.

Mobile communication devices such as mobile phones, smartphones and the like are increasingly being used to store different types of data such as music files, photographs and moving image clips. However, the comparatively small display of a mobile telephone or a smartphone may not be suited for a particular presentation of visual information, and a small display may be inconvenient if a user wants to present visual information to several other people at the same time.

BRIEF DESCRIPTION OF THE DRAWINGS

The present disclosure is explained below in an example manner with reference to the accompanying drawings, wherein.

DETAILED DESCRIPTION

Mobile phones or smartphones often have the necessary memory space and processing capabilities required to store and manage visual data. In this context, visual data shall include, but not be limited to, individual (still) pictures, animation sequences or movie clips, slideshows of several images that are to be shown in a predefined order (e.g. PowerPoint™ presentations that might or might not include animation effects as well as static images), or other displays of information with or without graphics. However, there is a huge and growing variety of file and codec formats for documents, presentations, pictures and movies, so typically, not all of them are supported directly on the mobile communication device.

According to an example embodiment, a method for displaying visual data with the help of a mobile communication device is proposed. The method includes: transferring control data and visual data from the mobile communication device (e.g. a mobile phone or a smartphone), to a rendering device via a short range communication link (e.g. wireless); rendering the received visual data at the rendering device; and displaying the visual data (e.g. on a separate display device that is connected via a video interface to the rendering device). The display of the visual data is controlled in accordance with the control data received from the mobile communication device.

The visual data may include any format or document type that is suitable for encoding visual information such as images or videos. An example for visual data might be a PowerPoint™ presentation that contains a sequence of individual slides (i.e. static images) and animation effects. The control data may include data specifying how, where and when to present the visual data. For example, the control data may include rendering data such as layout information specifying where to position visual data elements and their relation to other visual data elements (e.g. in front overlaying another data element, as background, etc.). The control data may further include navigation instructions such as for example "page forward/backward" or instructions on how long an individual image or animation sequence is to be shown until the next image in the presentation is to be displayed. For animation sequences, the control data may also include instructions on when display of an individual animation sequence is to be interrupted and when it is to be continued, or whether parts of the sequence are to be skipped or repeated.

With the proposed method, visual data stored on a mobile communication device such as a mobile phone or a smartphone can be displayed on an external display device without the mobile communication device itself being able to decode the visual data or perform the processing for rendering high-resolution images. The processing associated with decoding the file/codec format used for the visual data and rendering the visual data for display on the display device is performed in the rendering device. As the display of the visual data is controlled by the mobile communication device, the user only needs to interact with his mobile phone or smartphone in order to control the presentation on the external display device, in an example embodiment. Thus, the user can use his own familiar mobile communication device as the interface for controlling the presentation.

As the mobile communication device does not need to communicate directly with the external display, only the rendering device needs to be provided with an interface that is compatible with the exact type of display device to be used. The mobile communication device and the rendering device may communicate with each other via a short-range communication standard, such as Bluetooth™, Wireless LAN (WLAN)/WiFi (e.g. from the IEEE 802.11 family), (wireless) Universal Serial Bus (USB) or the like. In many cases, such short-range communication capabilities are already provided on mobile phones or smartphones.

The visual data may be compressed data (e.g. in the form of compressed images such as in the JPEG or PNG format), or as compressed video (e.g. in the MPEG format). Other image/video formats or coding algorithms may be used as well. Using compressed visual data, even high-resolution visual data can be transferred from the mobile communication device to the rendering device via a short-range communication link with a fairly low bit-rate without transfer times becoming excessively long.

The method may further include transcoding the visual data into a unified data format. Visual data originally available in many different data formats can be transcoded into a unified data format so that only visual data coded in the unified data format is provided on the mobile communication device, which facilitates the handling of the visual data on the mobile device because it needs to know and handle only data in one format. Further, if the visual data is transcoded into the unified data format, the rendering device does not need to be able to read, decode and render visual data provided in a large variety of different data formats but only needs to be able to render visual data provided in the unified data format.

The unified data format may be a unified data format for encoding visual information such as image or video. For instance, different types of image data may be transcoded to a unified image data format. Alternatively or in addition, a file container format encapsulating media objects such as image or video and control data may be used as the unified data format. The file container format may specify the layout and timing for displaying the visual data and may enable interaction with the user. Such a file container format is e.g. provided by the SMIL (Synchronized Multimedia Integration Language) format as defined by the World Wide Web Consortium (W3C), the specification of which is incorporated by reference. The rendering device can then display a multimedia presentation by interpreting a SMIL description file and decoding the media objects contained therein.

In an example embodiment, the transcoding may be performed at an external server and the method includes transferring the transcoded visual data to the mobile communication device. The external server may be a server provided by a communications or service provider which communicates with the mobile phone or the smartphone via a wireless wide-area network connection (e.g. a cellular link), or it might be a server accessible via a WLAN hotspot which communicates with the mobile phone or smartphone via the WiFi communication standard. Alternatively, the external server could be a personal computer which is locally connected to the mobile phone or smartphone, e.g. via a USB or wireless USB interface.

Typically, visual data such as a slide show presentation is not created on the mobile communication device, but is created on a personal computer (PC) or the like and sent to the mobile communication device via a short-range communications link or e-mail. In the latter case, a server which is used to provide e-mail services to the mobile communication device may also be used to transcode the visual data into the unified data format.

The method for displaying data may further include: determining (e.g. at an e-mail server), that data which is to be sent to the mobile communication device (e.g. as e-mail attachment) includes visual data; transcoding the visual data into the unified data format at the server; and sending the transcoded visual data to the mobile communication device. This automatic transcoding of the visual data at the server ensures that the mobile communication device always receives the visual data in a format which can be used for rendering the visual data and displaying it on an external display device.

Alternatively, the method for displaying data may include: determining, at the server, that data which is to be sent to the mobile communication device includes visual data; storing the visual data at the server; sending the visual data to the mobile communication device; and, upon a request issued by the mobile communication device, transcoding the visual data into the unified data format at the server and sending the transcoded visual data to the mobile communication device. With the transcoding thus being performed only upon request, the user can decide whether he wants the particular visual data to be transcoded or whether he wants to receive and store only the original version of the visual data on his mobile communication device.

Alternatively, information relating to the visual data (e.g. a summary or a thumbnail of the visual data), is sent to the mobile communication device, instead of sending the complete visual data. Upon a request issued by the mobile communication device, the visual data is transcoded into the unified data format and sent to the mobile communication device. With this example embodiment, the visual data, whether in original or in transcoded format, is not automatically sent to the mobile communication device, but the mobile communication device is only informed of visual data being available at the server. This way, a user can determine whether to download the visual data and can avoid that a lengthy download of visual data is started at an inconvenient moment in time.

If the transmission of the visual data is not done automatically, the mobile communication unit may issue a request to transcode the visual data to the server when the communication link between the mobile communication device and the server fulfils a predetermined condition. This way, a transfer of transcoded visual data from the server to the mobile communication device is only started when e.g. the bandwidth or the signal strength of the communication link between the mobile phone or smartphone and the server is sufficient to allow a fast and complete download of the transcoded visual data. For instance, transmission of transcoded visual data is requested automatically when the mobile communication device is in the service area of a WLAN hotspot.

According to an example embodiment, the visual data may include one of more animated presentation slides such as a PowerPoint™ slide. Such animated presentation slides may include different media objects like text, images, animated icons and transition effects to bridge to a succeeding slide. During transcoding, image data and video data are generated for capturing the animated objects of a presentation slide, e.g. by rendering the animated presentation slide and performing a video capture. The video data (also called an animation sequence) may then be included in the transcoded visual data, thus preserving the animated content in the transcoded visual data. A presentation comprising a sequence of slides, some of which are animated, is thus transcoded to a sequence of static images and animation sequences coupled with control data defining the relationship between these media objects.

The transcoding of the visual data may include setting one of more markers at positions at which the display of the animation sequence (e.g. a movie clip) is interrupted or can be interrupted. This allows a user to stop and restart the presentation of animation sequences at the marker positions (e.g. by pressing a button on the mobile device), and thus to control the progress of a visual presentation.

According to an example embodiment, the visual data may include a plurality of static images and/or animated sequences. The method may further include transferring each image or animated sequence to the rendering device separately in response to user instructions. This feature ensures that only the visual data that is to be displayed next is transferred to the rendering device. Hence, data traffic is minimized and data security can be provided, as the user initiates and controls the transfer of every single image or animated sequence from his (fairly secure) smartphone to the (potentially less secure) rendering device.

Alternatively, the visual data might be completely transferred to the rendering device before the visual data is rendered and displayed on the display device. Herein, the visual data might be transferred as one large file (e.g. in a file container format such as SMIL), or the visual data might be transferred as a plurality of individual files (e.g. a plurality of individual JPEG or MPEG files), wherein the order in which those files are to be displayed is specified in the associated control data. In this case, only control data needs to be transferred during the presentation of the visual data, and it can be ensured that there will be no waiting times during the presentation that might otherwise be caused by the necessity to transfer large amounts of visual data during the presentation.

According to an example embodiment, the control data may include cursor position data. Based on this cursor position data, the rendering device then overlays a cursor symbol on the visual data that allows a user to highlight or select details or areas in a presentation without the need for an additional laser pointer or the like.

The cursor position data may be generated according to signals from acceleration sensors of the mobile communication device in order to provide an intuitive control of the cursor motion. Alternatively, the cursor position data may be generated according to signals from a touchscreen of the mobile communication device, wherein the relationship between the user input (e.g. touching a certain point on the touchscreen) and the resulting cursor position on the external display device is particularly easy to understand for a user.

According to another example embodiment, a mobile communication device is provided comprising: a memory unit adapted to store visual data; a communications subsystem adapted to transfer visual data and control data to a rendering device; and a user input device adapted to generate control data from user input in order to control the display of the visual data on an external display device.

The mobile communication device may be a portable handheld device such as a mobile telephone, a smartphone, data messaging device or the like. This example embodiment allows for the presentation of visual data on an external display device, such that the presentation can be controlled via the mobile communication device.

The communications subsystem may include any short-range communication technology, such as a Bluetooth™, (wireless) USB, WiFi/WLAN (e.g. IEEE 802.11) or an infrared communication interface. The communications subsystem enables the transfer of data to a corresponding communication subsystem of the rendering device. Depending on the bandwidth of the provided communication channel between the mobile communication device and the rendering device, visual data may be transferred in a compressed data format in order to allow for high-resolution images or animated sequences to be transferred in a reasonable amount of time. The communications subsystem is typically further configured to communicate with a cellular infrastructure according to a wireless wide-area communications standard, such as CDMA, GSM, GPRS, EDGE, and UMTS and the like.

The user input device may include a keyboard, trackwheel, trackball, trackpad, joystick, device movement interpreter (which processes movements made by the user to the mobile communication device as detected by the device's acceleration sensors), gesture interpreter (which processes a user's hand or figure gestures made while the hand or figure is hovering above a touchscreen), or a touchscreen, on which the user can input control instructions (such as "page forward/backward", "start/pause/resume", "speed up/slow presentation") for navigation within a slideshow or the like, or display of animated sequences.

The user input device may further be adapted to generate cursor position data for controlling a cursor that is displayed together with the visual data, e.g. based on acceleration sensors or a track ball. This allows the mobile communication device to be used not only for controlling the display of a presentation, but also to be used for pointing out relevant details on each slide.

According to a further example embodiment, a rendering device may include: a short-range communications subsystem adapted to receive visual data and control data from a mobile communication device; and a rendering module adapted to render visual data received from the mobile communication device for display on a display device connected to the rendering device. The rendering device further controls the display of the visual data in accordance with control data received from the mobile communication device.

In an example embodiment, the rendering device may include a memory unit to store received visual data. The storing may be temporary only for the rendering process, or (semi) permanent for reuse of the received visual data in a later presentation session. In an example embodiment, the memory unit includes a solid state memory, e.g. a flash memory and/or a disk file system. The control data may include a clear command issued by the mobile communication device to instruct the rendering device to clear its memory and delete all downloaded visual data. Alternatively or in addition, a delete command may be used to selectively delete downloaded visual data that is stored, e.g. as files on the disk.

Such a rendering device provides an interface between a mobile communication device and a display device, so that the mobile communications device does not need to be able to render high-resolution visual data and does not need to directly communicate with the display device. The rendering device may be provided as a standalone device that is connected to the display device, e.g. via a DVI or an HDMI interface, or it may be integrated with the display device.

The communications subsystem of the rendering device is typically compatible with the communications subsystem of the mobile communication device. In order to allow one rendering device to be used with a wide variety of different types of mobile communication devices, several alternative communication subsystems (e.g. Bluetooth and WLAN) may be provided in the rendering device in order to increase the likelihood that the rendering device and any given mobile communication device share a common short-range communication technology.

According to yet a further example embodiment, a system is provided comprising the mobile communication device as disclosed above, the rendering device as disclosed above and a display device.

It should be noted that the above mentioned example embodiments may be combined with one another or separated from one another in various ways. In particular, all possible claim and feature combinations are considered to be disclosed by the present document. Furthermore, the example embodiments and features outlined in relation with a system are equally applicable in relation to the corresponding method and vice versa.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

There are many situations where people want to show documents, presentations, pictures or movies to others. Often a fast and simple setup of presentation devices is required to have a natural and instantaneous experience when presenting visual information electronically. Because users typically want to give their "visual presentations" anywhere and at any time, a highly mobile setup of the presentation using, e.g. a mobile communication device such as a smartphone for the presentation, is useful.

Visual presentations mean that static information (pictures) or dynamic information (movie sequences) are shown over time. The user should have the possibility to control the progress of the presentation with an input device, e.g. by pressing a key to go forward or backward Animations or movies require that the presentation is shown as a sequence of pictures (images), whereas document pages, pictures or non-animated presentation slides can be rendered as individual images, either as pictures covering the whole screen or window areas on the screen.

Handheld devices like smartphones typically have all the necessary ingredients for managing visual presentation of information: They possess enough memory to store the visual presentations, they have good communication channels (e.g. cellular, WiFi, Bluetooth™ or USB) to send and receive information, they have at least one input device such as a keyboard, touchscreen or acceleration sensors. In addition, a rendering device may be connected as an accessory to receive the visual information from the smartphone and render it on an external display, be it a projector, TFT monitor or HD screen.

One problem is that there is a huge and growing variety of file and codec formats for documents, presentations, pictures and movies. Not all of them can be supported directly on the mobile device, so there is need for a unified solution that can still be used on a mobile device. In an example embodiment, visual data in input documents or media files are therefore converted into a unified file format. This conversion of input documents/media files to a "controlled animation format" allows handling of a large variety of visual data formats. Input documents are sent to a general file converter which transforms the input format to a unified animation format and returns it to the mobile device. Thus, different formats of visual presentations such as text documents, presentations, pictures or movies are converted to one unified format, which is supported by the mobile device. The unified data format is basically a movie format that can be interrupted at any time and also at predefined marker positions in the stream.

A further example embodiment to consider is how to control the visual presentation without the need for additional gadgets, which would make the presentation setup more complicated. Since the handheld mobile device already stores the converted animated presentations, a (remote) control of the presentation by the handheld is useful. As mentioned before, the idea is to have a presentation setup with a minimum number of devices involved, so the handheld is sufficient to give the presentation. For example, the mobile device can be used to go forward and backward in a presentation by sending a command to the rendering device. It is also possible to use keypresses to send a suitable picture or movie scene to the rendering device. It is also useful to have an equivalent of a pointer such as a laser pointer to highlight details in a presentation. It is therefore suggested to use an acceleration sensor signal from the handheld which provides the orientation of the device relative to the center of the earth to determine the position of a pointer in the presented image: The user can tilt the device to move the cursor to the suitable position. The tilt angles are converted into a pointer position on the screen. The screen coordinates are sent to the rendering device, and the pointer is drawn as a superimposed image (with or without transparency). This allows for an intuitive remote control of the presentation by the handheld itself.

Figure 1:
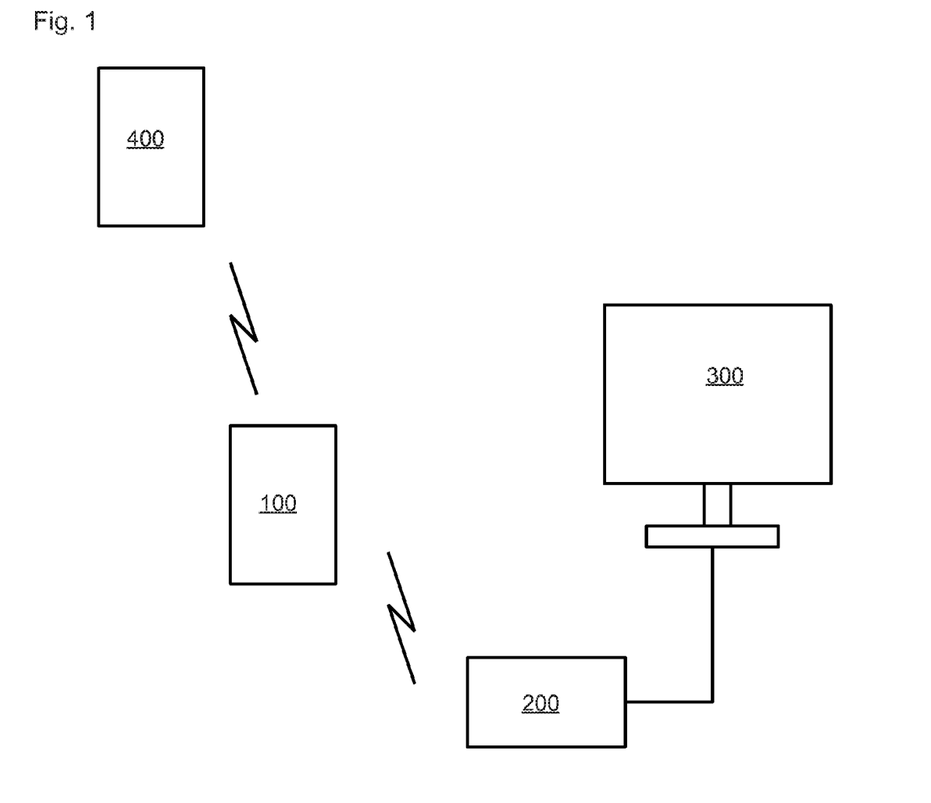
FIG. 1 shows a schematic structure of the visual presentation system, according to an example embodiment.

In the example embodiment shown in FIG. 1, a mobile communication device 100 communicates via a wireless local area network (WLAN) connection (e.g. using the WiFi communication standard) with a rendering device 200, which in turn is connected to a display device 300. Additionally, an external server 400 is provided that communicates with the mobile communication device via a wireless wide-area network connection (e.g. a cellular link).

The example embodiments described herein generally relate to a mobile communication device 100, hereafter referred to as a mobile device. Examples of applicable communication devices include pagers, cellular phones, cellular smart-phones, wireless organizers, personal digital assistants, computers, laptops, handheld wireless communication devices, wirelessly enabled notebook computers and the like. The mobile device 100 is a two-way communication device with advanced data communication capabilities including the capability to communicate with other mobile devices or computer systems through a network of transceiver stations. The mobile device 100 may also have the capability to allow voice communication. Depending on the functionality provided by the mobile device, it may be referred to as a data messaging device, a two-way pager, a cellular telephone with data messaging capabilities, a wireless Internet appliance, a smart-phone, or a data communication device (with or without telephony capabilities).

The user only interacts with the mobile device 100 that connects to the local or remote file conversion server 400 via the wide-area network connection. The converted, but still compressed, visual content is then forwarded to the rendering accessory 200 via the local area network connection. The accessory 200 handles the visual content rendering and the timing of animations. It also accepts user input to control the progress of the presentation (like skip forward, pause or backward).

The rendering device 200 may be a standalone device that is connected to the display device 300 via a DVI or HDMI interface, or it may be incorporated into the display device 300. The display device 300 may be any type of display, such as a projector, TFT monitor or HD screen. The external server 400 may be a server provided by a communications or internet service provider and may communicate with the mobile communication device 100 via a cellular link.

In the example embodiment of a method for displaying visual data, the mobile communication device 100 receives visual data from the server 400 via the cellular link, e.g. as a slideshow attachment to an e-mail message sent to the mobile communication device 100. The visual data may include a single image, a plurality of images that are to be displayed as a slideshow, a single animation sequence or movie clip or a series of images and/or animation sequences. The visual data may also be generated by the mobile communication device 100, e.g. via a built-in camera or the like that can take photographs and movie clips at high resolution. The visual data may, in principle, be provided in any data format that is suitable for the presentation of visual information.

When initiating the presentation, the visual data is transferred from the mobile communication device 100 to the rendering device 200 via a wireless short-range communication link such as Bluetooth™, wireless USB, WLAN or the like.

Control data relates to how, where and when to render the visual data for display. Control data may include instructions for controlling the display of the visual data such as layout information specifying how the visual data is positioned on the display device, the size of the displayed data (e.g. in pixels), the sequence of displayed images or movie clips, etc. Control data may further include timing information such as start or stop times or pause durations. The control data may be generated at the mobile communication device 100, e.g. by a user entering commands via a keyboard, and transferred to the rendering device 200 via the short-range wireless communication link.

The rendering device 200 interprets the control data, decodes the received visual data, renders it for display on the display device 300 and controls the display according to the received control data. The rendering device allows for the presentation of the (animated) content with high resolution, e.g. most likely higher than the resolution that the mobile device supports, as the rendering device can support higher quality codecs that are not available on the mobile device.

In an example embodiment, the mobile device is used to receive content from the server, store it on the device, transmit it to the rendering device and control the presentation of the content, but the mobile device itself is not used for content rendering and does not need to support the different data formats or codecs, as the rendering device does the decoding and rendering of content, e.g. on a HD screen. At the same time the rendering device receives user input provided by the mobile device to control the presentation and responds to and interprets the user commands (e.g. drawing a cursor superimposed to the actual content, flipping the presentation forward/backward). The separation of the mobile device and the rendering device has an important technical consequence: The content (e.g. a HD video) may have a very high data rate (e.g. in the Gbit/s range) when delivering uncompressed to the display device. In the proposed solution, however, the content is sent to the rendering device in a compressed format. This data rate is e.g. in the Mbit/s range which is feasible e.g. via WiFi or USB. The "control stream" of user inputs is a second stream of data sent from the mobile device to the rendering device, but the control data rate is e.g. in the Kbit/s range and can be neglected in terms of data rate. Furthermore, the rendering device is directly connected to the display (say via DVI or HDMI interface), but the mobile device does not have to support these interface standards and can use an existing WiFi or USB interface.

Figure 2:
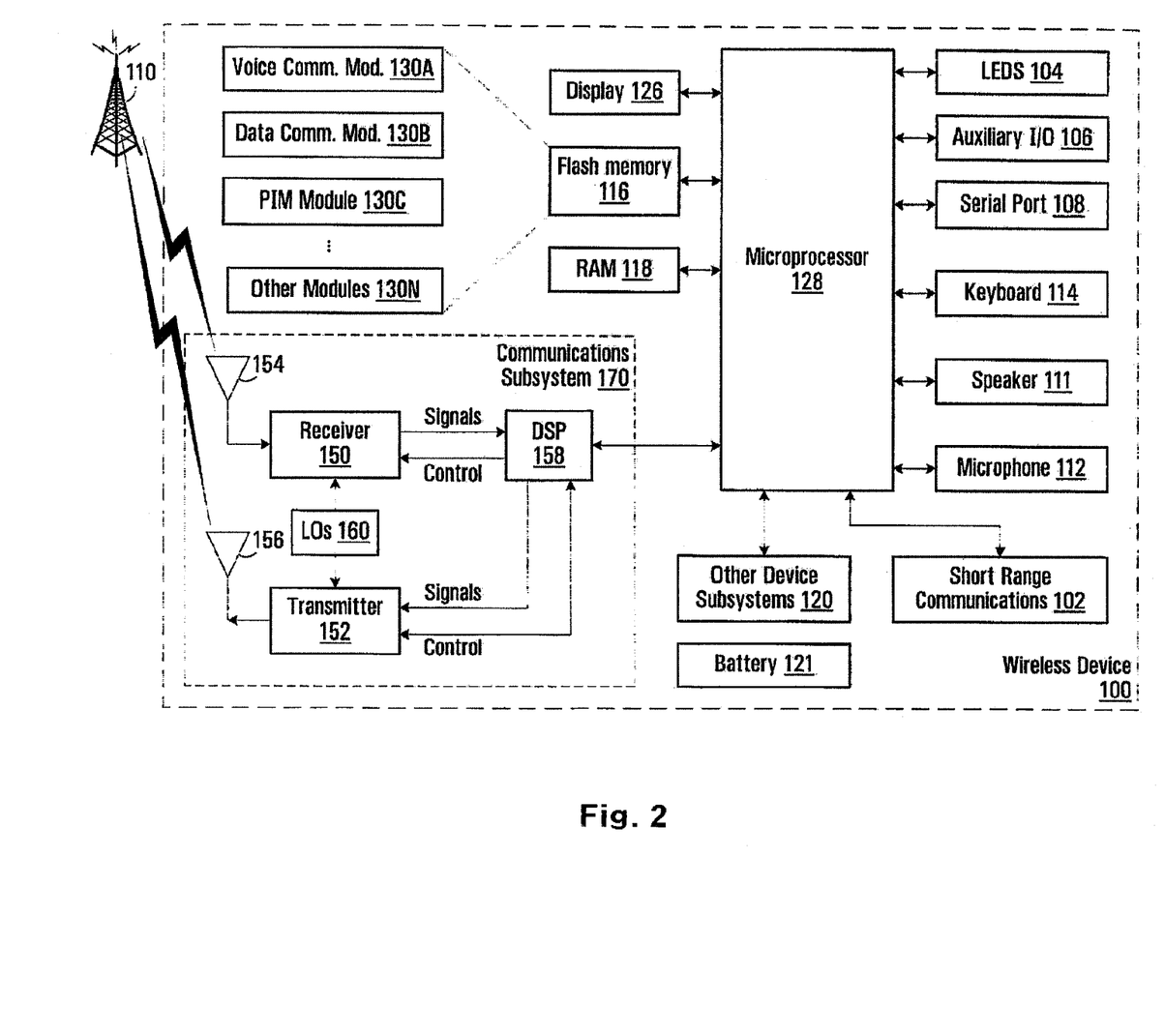
FIG. 2 schematically shows an example embodiment of a mobile communication device on which the methods and systems described in the present document may be implemented.

Referring to FIG. 2, shown is a block diagram of a mobile communication device or wireless device 100 that may, for example, implement any of the methods described in this disclosure. It is to be understood that the wireless device 100 is shown with specific details for example purposes only. A processing device (a microprocessor 128) is shown schematically as coupled between a keyboard 114 and a display 126. The microprocessor 128 controls operation of the display 126, as well as the overall operation of the wireless device 100, in response to actuation of keys on the keyboard 114 by a user.

In addition to the microprocessor 128, other parts of the wireless device 100 are shown schematically. These include: a communications subsystem 170 used for communicating with the external server 400; a short-range communications subsystem 102 used for communicating with the rendering device 200; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The auxiliary I/O devices 106 may include acceleration sensors (with a device movement interpreter (which processes movements made by the user to the mobile communication device as detected by the device's acceleration sensors), a touchscreen, trackwheel, trackball, trackpad, joystick, or gesture interpreter (which processes a user's hand or figure gestures made while the hand or figure is hovering above a touchscreen).

The wireless device 100 may have a battery 121 to power the active elements of the wireless device 100. The wireless device 100 is in an example embodiment a two-way radio frequency (RF) communication device having voice and data communication capabilities. In addition, the wireless device 100 in an example embodiment has the capability to communicate with other computer systems via the Internet.

Operating system software executed by the microprocessor 128 is in an example embodiment stored in a persistent store, such as flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the wireless device 100 may also be stored to the RAM 118. Further, one or more storage elements may have loaded executable instructions capable of causing a processor, such as microprocessor 128, to perform any of the methods outlined in the present document.

The microprocessor 128, in addition to its operating system functions, enables execution of software applications on the wireless device 100. A predetermined set of software applications that control basic device operations, such as a voice communications module 130A and a data communications module 130B, may be installed on the wireless device 100 during manufacture. In addition, a personal information manager (PIM) application module 130C may also be installed on the wireless device 100 during manufacture. Additional software modules, illustrated as another software module 130N, may be installed as well during manufacture. Such an additional software module may also include an application for controlling the presentation of visual data via the rendering device.

Communication functions, including data and voice communications, are performed through the communication subsystem 170 and, possibly, through the short-range communications subsystem 102. The communication subsystem 170 includes a receiver 150, a transmitter 152 and one or more antennas, illustrated as a receive antenna 154 and a transmit antenna 156. In addition, the communication subsystem 170 also includes a processing module, such as a digital signal processor (DSP) 158, and local oscillators (LOs) 160. The communication subsystem 170, having the transmitter 152 and the receiver 150, includes functionality for implementing one or more of the example embodiments described above in detail. The specific design and implementation of the communication subsystem 170 is dependent upon the communication network in which the wireless device 100 is intended to operate.

In data communication mode, a received signal, such as a text message, web page download of a video/audio track or an e-mail message, is processed by the communication subsystem 170 and is input to the microprocessor 128. The received signal is then further processed by the microprocessor 128 for output to the display 126, the speaker 111 or alternatively to some other auxiliary I/O device 106, e.g. a set of headphones or other audio rendering device. A user of the device may also compose data items, such as e-mail messages, using the keyboard 114 and/or some other auxiliary I/O device 106, such as a touchscreen, a trackball, a rocker switch, a thumb-wheel, or some other type of input device, and such composed data items may then be transmitted over the communication network 110 via the communication subsystem 170.

In voice communication mode, overall operation of the device is substantially similar to the data communication mode, except that received signals are output to a speaker 111, and signals for transmission are generated by a microphone 112. The short-range communications subsystem 102 enables communication between the wireless device 100 and other proximate systems or devices, which need not necessarily be similar devices. For example, the short range communications subsystem may include an infrared device and associated circuits and components, a Bluetooth™ communication module to provide for communication with similarly-enabled systems and devices, or a WLAN/WiFi communication module according to the IEEE 802.11 standards.

In an example embodiment of the mobile device 100, the communication subsystem 170 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the example embodiments described herein are intended to use any other suitable standards that are developed in the future. The wireless link connecting the communication subsystem 170 with the wireless network 110 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 110 associated with mobile device 100 is a GSM/GPRS wireless network in one example implementation, other wireless networks may also be associated with the mobile device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

Figure 3:
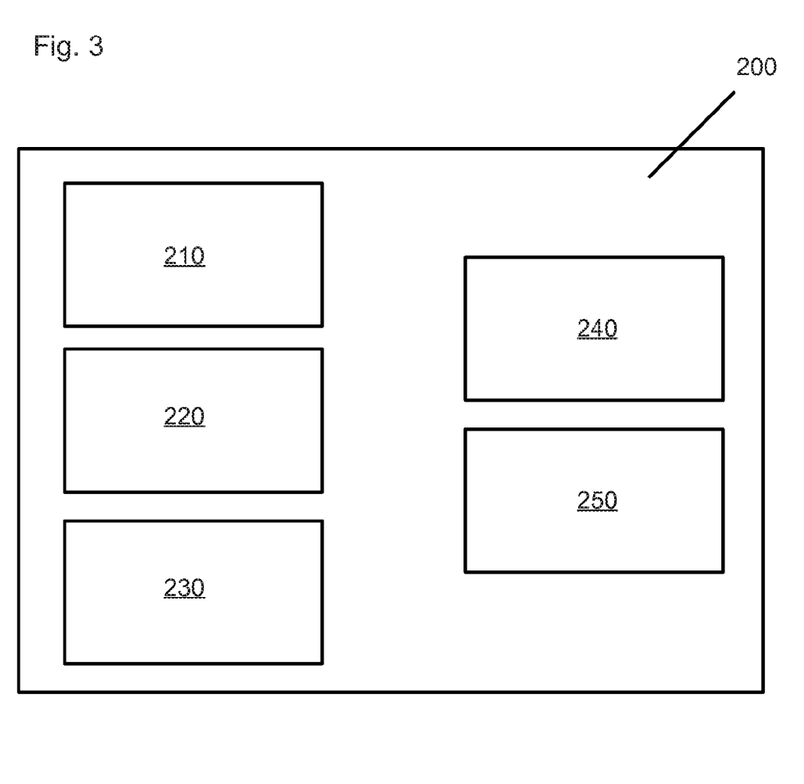
FIG. 3 schematically shows an example embodiment of a rendering device on which the methods and systems described in the present document may be implemented.

Referring to FIG. 3, the rendering device 200 of an example embodiment includes a wireless short-range communications subsystem 210, an interface 220 for connection with a display device 300, a microprocessor 230, a memory unit 240, and a power supply 250.

The wireless short-range communications subsystem 210 enables communication between the rendering device 200 and the mobile communication device 100. The short-range communications subsystem 210 of the rendering device 200 is similar to the short-range communications subsystem 102 of the mobile communication device 100 and may thus also include a Bluetooth™ communication module to provide for communication with similarly-enabled systems and devices.

The interface 220 is adapted to enable the transfer of visual data at a high resolution and high bit rate (in the Gbit/s range) from the rendering device 200 to the display device 300. The interface 220 might be a DVI or an HDMI interface.

The microprocessor 230 and the memory 240 are used to implement a rendering module that is capable of rendering compressed visual data received from the mobile communication device 100 and displaying the visual data on the display device 300. Additionally, the rendering module controls the display of the visual data such that control instructions received from the mobile communication device 100 (e.g. a control instruction to move one page forward or backward in a presentation document) are executed on the display device 300.

The mobile communications device 100 stores visual data in a suitable memory unit, such as the flash memory 116. The visual data will generally include both static information (images) and dynamic information (animated sequences), which are shown in a predetermined order and timing, wherein the user can determine the progress of the presentation, e.g. by pressing a key to go forward or backward.

According to an example embodiment, the visual data is transcoded into a unified data format. A presentation can consist of one or more different media objects (e.g. text, images, videos, audio, etc.) which might be animated and should be controlled by the user. The individual formats are recognized on the transcoding server and are converted to a minimal set of formats suitable for the rendering device. The transcoding server transforms any input format for visual data into a unified data format (also referred to as the unified animation format). This converter could in principle be run on the mobile communication device 100, but, due to the large variety of different input formats and the high processing requirements, it is more economical to run the file converter as a network service on a central server 400.

According to an example embodiment, the unified data format provides the different pages or slides in a presentation as a sequence of images where the user determines the progress of the presentation by a user input (e.g. a keypress). Parts of the screen (window areas) may be redrawn so that simple animations, such as letting bullet points appear on a presentation slide, can be represented by activating smaller picture areas on the screen. A sequence of static images and movie clips may be generated for more complex animations. When an image object is displayed, the system waits for user input that is detected by the input device of the mobile communication device 100 and transmitted to the rendering device 200. Then, a new image is rendered, or playback of a movie clip is started. The user can interrupt an animation at any time by pausing or stopping the playback via respective control commands.

For a slideshow of static images (without transition effects), the transcoded file is typically a sequence of compressed high resolution images (e.g. in JPEG or PNG format). In many cases (e.g. for images in a compressed format such as JPEG or PNG), no format conversion of the visual data is necessary; the visual content is merely repackaged into a container file format and control data added. Similarly, movie formats like MPEG are already compressed, and the visual data is repackaged into the container file format and control data added.

For a slideshow with animation effects such as transitions between slides or animated icons, the animations are rendered with high resolution (e.g. on an HD screen) and a slow transition rate, and video capture is performed in order to create a short movie clip of the animated sequence. A sequence of static images and short animation movies is created from the slideshow, thus preserving the animated content in the transcoded visual data.

An example is a PowerPoint™ presentation with animation effects. The actual slide information can be transmitted as a sequence of images. For the bits of animation that glue the static images together, it is suggested to use a movie format (such as MPEG). The movie can be restricted to the area of the presentation where the animation is displayed. Thus, only small-sized movies are necessary to capture the animation effects like animated icons. The transcoder generates a sequence of images and one or more movies for capturing the animation effects from the animated presentation. Control data specifies the timing and positional relationships between the images and movies, e.g., when and where on the display screen a movie is added to the images. The transcoded visual data and the associated control data are encoded in the container format and transmitted to the rendering device that then puts together the visual objects to render the presentation. For instance, a small-sized movie is overlaid on a respective part of an image to display animation effects of the presentation. In other words, during the playback-and-capture of the movie to create the animation from a section of the screen, the image may be used as a background picture for that screen section.

In order to allow a user to control the presentation, one or more markers may be set at positions at which the user can either stop the animation or at which the animation may be stopped automatically to wait for a keypress by the user. Thus, a user can pause the animation at marker points, skip forward to the next marker or skip back to the previous marker point. Thereby, the user can control the progress of the visual presentation in a way similar to that of a classical presentation. As markers typically separate scenes in a presentation, showing a sequence of images can be considered to have implicit markers, i.e. an image is shown either indefinitely or for some seconds. For a slideshow presentation, the markers would typically be placed at the same positions where the presentation would stop when shown on a PC. Similarly, for a movie, markers could be set at equidistant positions in time. In addition, the user may be prompted during the transcoding process to define marker positions so that the presentation can be interrupted at these predefined marker positions.

An example of a unified data format is SMIL, which provides a file container format that binds together several media objects, specifies their layout and timing on the display and enables interaction with the user. The transcoding server 400 converts the media objects and creates an SMIL description document. The rendering device 200 decodes the media objects and creates a multimedia presentation by interpreting the SMIL description file.

A basic layout of an SMIL file is shown below:

```
<smil>
    <head>
        <meta name="copyright" content="Your Name" />
        <layout>
            <!-- layout tags -->
        </layout>
    </head>
    <body>
        <!-- media and synchronization tags -->
    </body>
</smil>
```

The following two SMIL code examples show how an animated sequence of images is described and how basic SMIL event handling takes place. The first example refers to SMIL layout for animated images, shown in sequence and in parallel:

```
<smil>
    <head>
        <layout>
            <root-layout width="300" height="200"
                background-color="white" />
            <region id="first_icon" left="75" top="50"
                width="32" height="32" />
            <region id="second_icon" left="150" top="50"
                width="100" height="30" />
        </layout>
    </head>
    <body>
        <!-- the sequence starts below with
            the "seq" tag -->
        <seq>
            <img src="image1.gif"
                alt="The first image"
                region="image1" dur="6s" />
            <img src="image2.gif"
                alt="The second image"
                region="image2" dur="4s" begin="1s" />
        </seq>
        <par>
            <img src="image3.gif" alt="The third image"
                region="image3" dur="6s" />
            <img src="image4.gif" alt="The fourth image"
                region="image4" dur="8s" />
        </par>
    </body>
</smil>
```

The second example relates to SMIL event handling: a second image is shown 2 secs. after the first image is rendered on the display.

```
<smil>
    <!-- head (skipped) -->
    <body>
        <par>
            <!-- start display of second image 2s after the first -->
            <img src="image1.gif" region="The first image"
                id="im1" begin="4s" />
            <img src="image2.gif" region="The second image"
                begin="id(im1)(2s)" />
        </par>
    </body>
</smil>
```

If the user wants to pause a presentation, issuing a pause command can be interpreted as freezing the time. Thus, no progress is made in the animation sequence.

It is also conceivable to add SMIL tags that require user input before progressing further in a presentation so that a user can adjust the progress of a presentation at will. Navigation within a presentation, e.g. selecting a slide to be displayed by moving forward or backward in the predetermined sequence, may also be achieved with such tags.

Usually, visual data such as slideshows and presentations will not be created on the mobile communication device 100, but will be sent to the mobile communication device 100 over a cellular link, e.g. as an e-mail attachment. In this case, the visual data will pass through a server 400, such as a server provided by a communication system provider or an internet service provider, before it is delivered to the mobile communication device 100 via a mobile phone network. In an example embodiment, visual data is carried in attachments of e-mails that are redirected to mobile communication devices by a Blackberry™ e-mail server such as a Blackberry™ Enterprise Server (BES) or a Blackberry™ Internet Server (BIS).

If the server 400 recognizes visual data that is to be sent to a mobile communication device 100, a file conversion utility provided on the server 400 automatically transcodes the visual data and then sends only the transcoded visual data to the mobile communication device. A copy of the original visual data may also be sent on to the mobile communication device 100 along with the transcoded data. Further, it may depend on the format of the visual data whether an automatic transcoding is performed in the server 400 and which versions of the visual data are sent to the mobile communication device.

The delivery of visual data to the mobile communication device 100 may further depend on the available bandwidth and signal quality of the communication link between the server 400 and the mobile communication device 100. For example, transcoded visual data might be delivered to the mobile communication device 100 only when it is in reach of a WLAN hotspot or when the available bandwidth over a cellular link exceeds a predetermined threshold value.

In an example embodiment, transcoding of visual data may be performed on the server 400 only in response to a user request. For example in a typical example embodiment, the server 400 is an e-mail server that stores emails addressed for the mobile communication device. The user of the mobile device may then cause the mobile device to issue a request to retrieve an attachment to an email that is stored on the email server. In response to receiving the request (e.g. in form of an email message), the server 400 transcodes the visual data in the requested attachment and returns the transcoded visual data as an email attachment to the mobile device.

Alternatively, the mobile communication device 100 sends an email including an attachment with the visual data to a transcoding e-mail server 400 (e.g. using a predetermined e-mail address such as transcoding@rim.com). Upon receiving the e-mail, the transcoding e-mail server 400 transcodes the attachment and returns the transcoded visual data as an attachment via e-mail to the mobile device 100.

In an example embodiment, the communication between the server 400 and the mobile communication device is through a WLAN connection. The mobile communication device 100 transfers the visual data via the WLAN connection and possibly other wide-area communication links such as the Internet to the transcoding server 400 and receives the transcoded visual data in return from the server 400.

The transcoding of visual data may also be executed on a local PC as file conversion utility. For instance, the mobile communication device 100 may send visual data to be transcoded to the PC (e.g. via a USB or a wireless USB link), and then receive transcoded visual data in the unified data format from the PC. Alternatively, the visual data may be generated on the PC, transcoded into the unified data format, and send via the short-range communications link to the mobile communication device.

Figure 4:
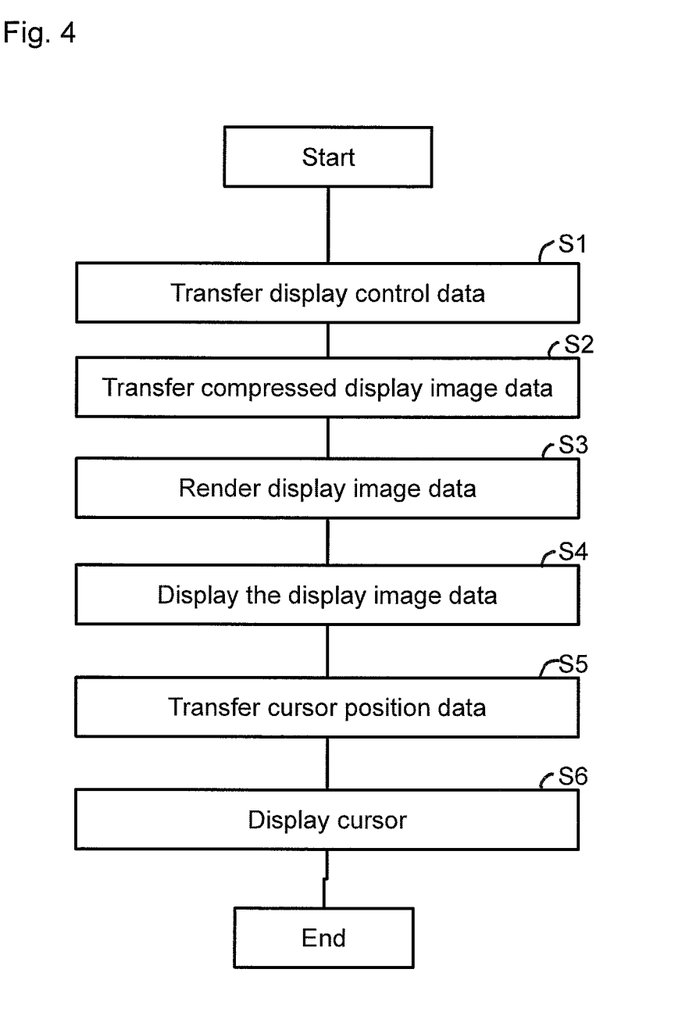
FIG. 4 is a flow diagram illustrating the method, according to an example embodiment.

Referring to FIG. 4, an example method for displaying data is explained in detail.

In step S1, the mobile communications device 100 transfers control data, such as instructions to start displaying one image or one sequence of moving images as visual data, and instructions on layout and timing and the like to the rendering device 200 via the short-range wireless communication subsystems 102 and 210. These instructions might be provided as separate user input control instructions, which might e.g. be generated by the user actuating keys on the keyboard 114, actuating navigation keys or operating a touchscreen. At least some of the control data might also be contained in an SMIL description document which contains the visual data.

In step S2, the mobile communication device 100 transfers the visual data that is specified by the control data to the rendering device 200. As the visual data is in a compressed format (e.g. a Mbit/s transmission rate), as provided e.g. by Bluetooth™ short-range communication subsystems 102 and 210 is sufficient to allow even high resolution visual data to be transferred to the rendering device 200 in a relatively short amount of time.

In step S3, a rendering module of the rendering device 200 decodes the visual data and control data received from the mobile communication device 100, e.g. in a container file. The rendering module extracts the visual data relating to the image or animation sequence to be displayed and the control data relating to layout and control instructions from the container file, e.g. the SMIL description document. The rendering module then decompresses the image or animation sequence data and renders the visual data for display on the display device 300 in accordance with the accompanying control instructions.

In step S4, the rendering device initiates and controls the display of the visual data on the display device 300 according to the control instructions provided in the control data. A control instruction can include commands for displaying a static image on the display device 300 for a predetermined time or for displaying an image until the user sends another control instruction. It can further include commands for displaying an animation sequence of a predetermined length or up to a predetermined marker point and then waiting for the next control instruction.

In step S5, the mobile communication device 100 transfers cursor position data to the rendering device 200. Such cursor position data may be generated by translating a user input control instruction received e.g. via a touchscreen of the mobile communication device to position information, or it might be generated using acceleration sensors and a device movement interpreter of the mobile communication device 100 as explained below with reference to FIG. 5.

Figure 5:
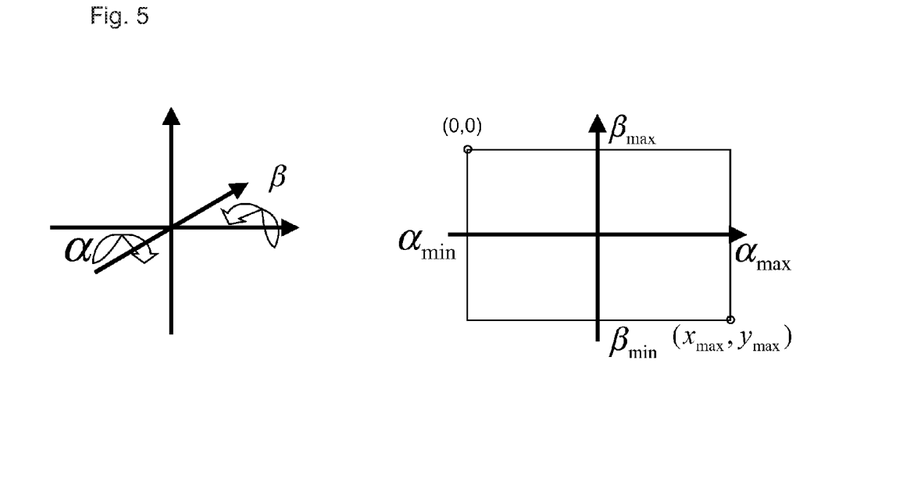
FIG. 5 illustrates the use of acceleration sensors of the mobile communication device for controlling a cursor location on a display device, according to an example embodiment.

According to an example embodiment, the mobile communication device 100 is provided with acceleration sensors that can be used to map the tilt angles of the device 100 relative to the direction of the earth center to cursor positions (x,y) on the screen. Herein, a denotes an amount of tilt along one axis parallel to the ground, and $\beta$ denotes an amount of tilt along another axis, which is also parallel to the ground but perpendicular to the axis of tilt amount a (see FIG. 5). A cursor position (x, y) can thus be calculated as $$\begin{pmatrix} x \\ y \end{pmatrix} = \begin{pmatrix} x_{max} s\left(\frac{\alpha - \alpha_{min}}{\alpha_{max} - \alpha_{min}}\right) \\ y_{max} s\left(\frac{\beta - \beta_{max}}{\beta_{min} - \beta_{max}}\right) \end{pmatrix}$$

with a saturation function $$s(x) = \begin{cases} 0 & \text{for } x < 0 \\ x & \text{for } 0 \leq x \leq 1 \\ 1 & \text{for } x > 1 \end{cases}$$

The calculation of the cursor position from the tilt angles may be performed in the mobile communication device 100. In this case, instead of an absolute value (x, y) of the cursor position (e.g. in pixels relative to the display origin), a relative value ($x/x_{max}$, $y/y_{max}$) can be generated if the mobile communication device 100 has no information on the size and resolution of the display device.

Alternatively, the mobile communication device 100 might transfer the tilt amounts α and β directly to the rendering device 200 which then calculates a cursor position (x, y) according to the equation stated above.

Referring back to FIG. 4, in step S6 the rendering device 200 renders a cursor symbol and displays it at the position indicated by the cursor position data on the display device 300. Steps S5 and S6 can be repeated in order to allow the cursor to be moved along the display according to the cursor position data generated via the touchscreen or the acceleration sensors of the mobile communication device.

The cursor can be rendered dynamically and with or without transparency on the external display; e.g. the cursor can be shown simply as a finger pointer while in motion and, when the cursor stops, as a flash with circles around it that then starts to blink to show the current position and to highlight the image or information displayed underneath the cursor. This makes detection of the cursor position easier. Thus, a stationary cursor looks different from a moving cursor.

Figure 6:
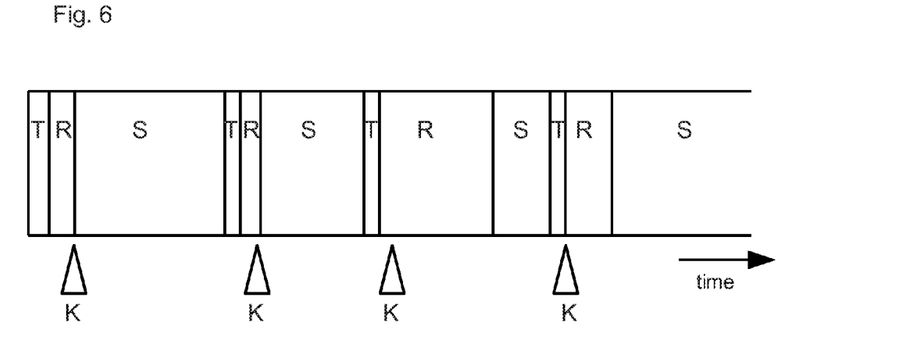
FIG. 6 shows a sequence of operations during the transfer and display of visual data, according to an example embodiment method.

With reference to FIG. 6, an example of an action sequence during the display of visual data according to an example embodiment of the proposed methods and devices is shown. The complete visualization is user-driven: Whenever the user sends control data to initiate new display content (e.g. by pressing a key such as "forward" on the mobile communication device 100), the compressed content, either a static image or a moving image sequence for animated content, is transferred to the rendering device, decoded and rendered there. Then the display stays constant until the user initiates the next action.

The reference symbol K in FIG. 6 denotes a keypress by the user. When a user initiates the display of visual data, the image or animation sequence to be displayed next is transferred to the rendering device 200 in a compressed format (reference symbol T). This way, only the visual data that is supposed to be displayed next is transferred to the rendering device 200. Data transfer times before the start of a presentation are thus kept to a minimum and no unnecessary visual data is transferred to the rendering device 200 if e.g. a slideshow presentation is interrupted or aborted before all slides have been shown. A user might further skip over the image(s) or animation sequence(s) that he does not want to be displayed, and the respective data will not be transferred to the rendering device 200.

This can provide high data security as a user might not want sensitive or confidential information being transferred from his fairly secure smartphone to a rendering device that might be used by a large number of people, e.g. during a conference where several speakers use the same projector display for their presentations. As in the present example embodiment, only the respective next image or animation sequence is transferred to the rendering device, allowing the user to decide for each individual image or animation sequence whether it should be accessible to others or whether it should not be transferred to another device. In addition, clear and/or delete commands may be used to clear the memory of the rendering device or delete individual visual data files that are stored in the memory of the rendering device. Additionally, it is an option to encrypt the data traffic between the mobile device and the rendering device in order to ensure data security.

After the transfer T of visual data to the rendering device 200 (reference symbol T in FIG. 6), the visual data is rendered as a static image or an animated sequence (as denoted by reference symbol R). After the rendering of the image or the complete display of the animated sequence, static content (denoted by reference symbol S) is shown on the display device until the next keypress K by a user initiates the transfer, rendering and display of the next image or animation sequence.

For an image, the static content is simply the image itself, which is displayed until the next keypress by the user. For an animation sequence, the static content may be the last frame of the sequence, or it may be a predetermined image, icon or the like, which is shown after the last frame of the animation sequence and until the next keypress by the user.

The proposed methods and systems allow for the presentation of a large number of document types and media objects that can be stored on and presented from an existing handheld device. The handheld serves both as a presentation and remote control device at the same time. The rendering complexity is either shifted to a rendering accessory that is directly connected to an external display device or the rendering functionality can also be integrated directly into the external display device.

The methods and systems described in the present document may be implemented as software, firmware and/or hardware. Certain components may e.g. be implemented as software running on a digital signal processor or microprocessor, e.g. the microprocessor 128 of the mobile communication device 100, the microprocessor 230 of the rendering device 200 or a microprocessor of the server 400. Other components may e.g. be implemented as hardware or as application-specific integrated circuits. The signals encountered in the described methods and systems may be stored on media such as random access memory or optical storage media. They may be transferred via networks, such as radio networks, satellite networks or wireless networks. Typical devices making use of the method and system described in the present document are mobile telephones or smartphones.

FIG. 4 is a flow diagram of an example embodiment method for displaying data. Some of the steps illustrated in the flow diagram may be performed in an order other than that which is described. Also, it should be appreciated that not all of the steps described in the flow diagram are required to be performed, that additional steps may be added, and that some of the illustrated steps may be substituted with other steps.

Finally, it should be noted that any block diagrams herein represent conceptual views of illustrative circuitry embodying the principles of the present disclosure. Similarly, it will be appreciated that any flow charts, flow diagrams, state transition diagrams, pseudo code, and the like represent various processes that may be substantially represented in a computer readable medium and so executed by a computer or processor, whether or not such computer or processor is explicitly shown.

What is claimed is:

1. A method for controlling the displaying of visual data by a rendering device, including:
receiving, at a mobile communication device, an indication of visual data being available at an external server, the indication including information relating to the visual data;
issuing a request for transcoding the visual data into a unified data format at the external server, the unified data format specifying layout and timing for displaying the visual data, wherein visual data formats and/or the resolution of visual data in the unified data format are suitable for displaying by the rendering device;
receiving the transcoded visual data at the mobile communication device;
transferring control data and the transcoded visual data from the mobile communication device to the rendering device via a wireless communication link;
rendering the transcoded visual data at the rendering device; and
displaying the transcoded visual data by the rendering device, in accordance with the control data.

2. The method according to claim 1, wherein the visual data includes compressed image and/or video data.

3. The method according to claim 2, wherein the visual data is provided on the mobile communication device in a unified data format, the unified data format being a file container format.

4. The method according to claim 3, further including:
transcoding the visual data into the unified data format at an external server; and
transferring the transcoded visual data to the mobile communication device.

5. The method according to claim 1, wherein the visual data includes an animated presentation slide and the method includes: generating video data for capturing the animation effects of the presentation slide.

6. The method according to claim 1, wherein the visual data includes video data, and wherein the transcoding of the visual data includes setting one or more markers at time positions in the video data at which the display of video data is to be interrupted.

7. The method according to claim 1, wherein the visual data includes a plurality of media objects such as static images and/or movie clips, the method further including:
transferring media objects to the rendering device separately in response to user instructions.

8. The method according to claim 1, wherein the control data includes cursor position data, the method further including:
overlaying a cursor symbol on the displayed visual data in accordance with the cursor position data.

9. The method according to claim 8, further including:
generating the cursor position data according to signals from one or more acceleration sensors of the mobile communication device.

10. The method according to claim 8, further including:
generating the cursor position data according to signals from a touchscreen of the mobile communication device.

11. A mobile communication device, including:
a memory unit adapted to store visual data;
a communications subsystem adapted to:
receive an indication of visual data being available at an external server, the indication comprising information relating to the visual data
send a request to the external server for transcoding the visual data into a unified data format at the server, the unified data format specifying layout and timing for displaying the visual data, wherein visual data formats and/or the resolution of visual data in the unified data format are suitable for displaying by a rendering device;
receive the transcoded visual data from the external server; and
transfer the transcoded visual data and control data to the rendering device for display at the rendering device; and
a user input device adapted to generate the control data from user input to control the display of the transcoded visual data on an external display device.

12. The mobile communication device according to claim 11, wherein the user input device is further adapted to generate cursor position data for controlling a cursor that is displayed together with the visual data.

13. The mobile communication device according to claim 11, wherein the user input device includes a device movement interpreter.

14. The mobile communication device according to claim 11, wherein the user input device includes a touchscreen.

15. The mobile communication device according to claim 11, wherein
the visual data includes compressed image and/or video data and
the mobile communication device is configured to transfer each image or animated sequence to the rendering device separately in response to user instructions.

16. A visual presentation system including:
the mobile communication device according to claim 11, and
a file converter for receiving input documents from the mobile communication device, transforming input format to a unified animation format, and for returning the unified animation format to the mobile communication device.

* * * * *